United States Patent
Vasekin et al.

(10) Patent No.: US 10,296,349 B2
(45) Date of Patent: May 21, 2019

(54) ALLOCATING A REGISTER TO AN INSTRUCTION USING REGISTER INDEX INFORMATION

(71) Applicant: ARM LIMITED, Cambridge (GB)

(72) Inventors: Vladimir Vasekin, Cambridge (GB); Antony John Penton, Little Canfield (GB); Chiloda Ashan Senarath Pathirane, Cambourne (GB); Andrew James Antony Lees, Cambridge (GB)

(73) Assignee: ARM Limited, Cambridge (GB)

( * ) Notice: Subject to any disclaimer, the term of this patent is extended or adjusted under 35 U.S.C. 154(b) by 402 days.

(21) Appl. No.: 14/989,841

(22) Filed: Jan. 7, 2016

(65) Prior Publication Data
US 2017/0199738 A1 Jul. 13, 2017

(51) Int. Cl.
*G06F 9/38* (2018.01)

(52) U.S. Cl.
CPC .......... *G06F 9/3836* (2013.01); *G06F 9/384* (2013.01); *G06F 9/3851* (2013.01)

(58) Field of Classification Search
None
See application file for complete search history.

(56) References Cited

U.S. PATENT DOCUMENTS

| | | | | |
|---|---|---|---|---|
| 5,996,068 A * | 11/1999 | Dwyer, III | ............ | G06F 9/3851 712/217 |
| 6,104,731 A * | 8/2000 | Chow | ................. | G06F 9/30043 370/537 |
| 6,112,019 A * | 8/2000 | Chamdani | ............. | G06F 9/3836 712/214 |
| 6,550,001 B1 * | 4/2003 | Corwin | ................. | G06F 9/3836 712/216 |
| 2006/0155965 A1 * | 7/2006 | Altman | ................. | G06F 9/3838 712/215 |
| 2010/0299499 A1 * | 11/2010 | Golla | .................... | G06F 9/3851 712/206 |
| 2015/0154022 A1 * | 6/2015 | Khot | ................... | G06F 9/30123 712/217 |

OTHER PUBLICATIONS

Ros et al. (A Post-Compilation Register Reassignment Technique for Improving Hamming Distance Code Compression, Sep. 2005, pp. 97-104).*

* cited by examiner

*Primary Examiner* — George Giroux
(74) *Attorney, Agent, or Firm* — Nixon & Vanderhye P.C.

(57) ABSTRACT

Data processing circuitry comprises allocation circuitry to allocate one or more source and destination processor registers, of a set of processor registers each defined by a respective register index, to a processor instruction for use in execution of that processor instruction and to associate, with the processor instruction, information to indicate the register index of the allocated source and destination processor registers; the avocation circuitry being selectively operable to allocate, to a processor instruction, a group of destination processor registers having a subset of their register indices in common and to associate, with the processor instruction, information to indicate the register index of one processor register of the group and identifying information to identify one or more bits of the register index which differ between the processor registers in the allocated group of processor registers.

18 Claims, 5 Drawing Sheets

| 0000 |
|------|
| 0001 |
| 0010 |
| 0011 |
| 0100 |
| 0101 |
| 0110 |
| 0111 |
| 1000 |
| 1001 |
| 1010 |
| 1011 |
| 1100 |
| 1101 |
| 1110 |
| 1111 |

FIG. 6

| A |
|---|
| A' |
| A'' |
|  |
| A''' |
|  |
|  |
|  |
| A'''' |
|  |
|  |
|  |
|  |
|  |
|  |
|  |

FIG. 7

|  |
|---|
| B'' |
| B' |
| B |
|  |
|  |
|  |
| B''' |
|  |
|  |
|  |
| B'''' |
|  |
|  |
|  |
|  |

ALLOCATING A REGISTER TO AN INSTRUCTION USING REGISTER INDEX INFORMATION

BACKGROUND

This disclosure relates to data processing.

In an example type of data processor known as an out of order processor, processor instructions are decoded and issued in their program order, but are allowed to be executed in a different order. The order of execution depends upon the inter-dependency of the instructions and whether source data (being the output of a previous instruction in the program code order) has become available as an input to an instruction awaiting execution.

To achieve this, the instructions are buffered before execution, for example in a buffer known as a reservation station. The architectural source and output registers relating to execution of the instruction are mapped to respective ones of a set of physical processor registers, for example using tags to indicate which physical registers relate to an instruction held at the buffer. As part of instruction issue circuitry, so-called wake-up logic detects, for buffered instructions, when the source operands become available, and "wakes up" or enables the corresponding instruction to be issued for execution.

The wake-up logic for a reservation station typically requires compare logic to match each source operand against the destination (output) registers for already-issued instructions, in order to detect when the relevant data becomes available. Wake-up logic can, in some examples, be a large contributor to power consumption due to the large number of comparators.

SUMMARY

In an example arrangement there is provided data processing circuitry comprising:

allocation circuitry to allocate one or more source and destination processor registers, of a set of processor registers each defined by a respective register index, to a processor instruction for use in execution of that processor instruction and to associate, with the processor instruction, information to indicate the register index of the allocated source and destination processor registers;

the allocation circuitry being selectively operable to allocate, to a processor instruction, a group of destination processor registers having a subset of their register indices in common and to associate, with the processor instruction, information to indicate the register index of one processor register of the group and identifying information to identify one or more bits of the register index which differ between the processor registers in the allocated group of processor registers.

In another example arrangement there is provided data processing circuitry comprising:

instruction issue circuitry to issue processor instructions to instruction execution circuitry for execution, each processor instruction having one or more source and destination processor registers allocated for use in execution of that processor instruction, each said processor register having a respective register index;

the instruction issue circuitry being configured to detect whether a group of source processor registers allocated to a given processor instruction awaiting issue contain data available for use by the given processor instruction by comparing the register index of a given source processor register in the group with one or more register indices indicating the availability of data in respective processor registers, in which one or more register index bits indicated by identifying information associated with the given processing instruction are excluded from the comparison outcome.

In another example arrangement there is provided a data processing method comprising:

allocating one or more source and destination processor registers, of a set of processor registers each defined by a respective register index, to a processor instruction for use in execution of that processor instruction, the set of processor registers being a group of destination processor registers having a subset of their register indices in common; and associating, with the processor instruction, information to indicate the register index of one processor register of the group and identifying information to identify one or more bits of the register index which differ between the processor registers in the allocated group of processor registers.

In another example arrangement there is provided a data processing method comprising:

issuing processor instructions to instruction execution circuitry for execution, each processor instruction having one or more source and destination processor registers allocated for use in execution of that processor instruction, each said processor register having a respective register index; and detecting whether a group of source processor registers allocated to a given processor instruction awaiting issue contain data available for use by the given processor instruction by comparing the register index of a given source processor register in the group with one or more register indices indicating the availability of data in respective processor registers, in which one or more register index bits indicated by identifying information associated with the given processing instruction are excluded from the comparison outcome.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Before discussing the embodiments with reference to the accompanying figures, the following description of embodiments is provided.

An example embodiment provides data processing circuitry comprising:

allocation circuitry to allocate one or more source and destination processor registers, of a set of processor registers each defined by a respective register index, to a processor instruction for use in execution of that processor instruction and to associate, with the processor instruction, information to indicate the register index of the allocated source and destination processor registers;

the allocation circuitry being selectively operable to allocate, to a processor instruction, a group of destination processor registers having a subset of their register indices in common and to associate, with the processor instruction, information to indicate the register index of one processor register of the group and identifying information to identify one or more bits of the register index which differ between the processor registers in the allocated group of processor registers.

In examples, the circuitry comprises:

instruction issue circuitry to issue processor instructions to instruction execution circuitry for execution, comprising detection circuitry to detect whether the one or more source processor registers allocated to a given processor instruction awaiting issue contain data available for use by that given processor instruction;

the instruction issue circuitry being configured to compare the register index associated with a source processor register allocated to the given processor instruction with one or more register indices indicating the availability of data in respective processor registers, in which any register index bits indicated by identifying information associated with the given processor instruction and identifying one or more bits of the register index which differ between the processor registers in an allocated group of processor registers are excluded from the comparison outcome.

The example embodiments can avoid or reduce the need for multiple comparisons in wake-up logic for operands having multiple registers, by providing one register tag and mask information indicating any bit positions which differ between a group of registers associated with an operand, such that in the wake-up detection those bit positions can be ignored or disregarded in the comparison. This can allow one comparison to be used for the group of register mappings. This can in turn reduce the amount of circuitry and/or the power consumption of the system.

In examples, the one or more register indices indicating processor registers available for use are configured to indicate that processor registers allocated as destination processor registers for any processor instructions which are currently being handled by the execution circuitry are unavailable.

In example arrangements, the circuitry comprises execution circuitry having an execution pipeline of two or more pipeline stages.

For example, the instruction issue circuitry can be configured to buffer a processor instruction for which the comparison by the instruction issue circuitry indicates that one or more source processor registers allocated to that processor instruction do not contain data which is available for use by that processor instruction. For example, the instruction issue circuitry can be configured to perform a comparison in respect of one or more buffered instructions to detect whether a buffered instruction can be issued to the execution circuitry for execution.

Even where a group of two or more registers is not being used, the same mechanism can be applied, by example arrangements in which, when the allocation circuitry allocates one destination processor register to a processor instruction, the allocation circuitry is configured to associate, with the processor instruction, the identifying information to identify zero bits of the register index. In other examples the group of processor registers comprises $2^m$ processor registers having a subset of all but m bits of their register indices in common, where m is an integer equal to zero or more; and the identifying information identifies m bits of the register index which differ between the processor registers in the allocated group of processor registers.

Example embodiments provide an availability store, to store information indicating whether each processor register is available for allocation as a destination processor register; in which the allocation circuitry is configured to allocate processor registers which are indicated to be available for allocation and, in response to allocation of a processor register, to store information in the availability store indicating that the allocated processor register is not available for allocation; and in which the execution circuitry is configured, in response to completion of execution of a processor instruction, to store information in the availability store to indicate that a processor register which had been allocated to the completed processor instruction as a destination processor register is available for allocation.

The allocation process can itself be used to provide a greater choice of available register groups for later allocation, in which the allocation circuitry is configured to select, from amongst the processor registers indicated by the availability store to be available for allocation, one or more candidate processor registers for allocation as destination processor registers at a next allocation operation. In examples, the candidate processor registers comprise: one or more candidate individual processor registers for allocation as individual processor registers; and one or more candidate groups of two or more processor registers, each group having a subset of their register indices in common. In examples, the allocation circuitry is configured to select candidate individual processor registers in dependence upon a detection, for a processor register indicated by the availability store to be available, of how many groups of available processor registers include that processor register. For example, the allocation circuitry is configured to preferentially select, as candidate individual processor registers, processor registers included in greater numbers of groups of available processor registers.

In example embodiments the processor registers are physical processor registers;

the processor instructions define one or more logical registers; and the allocation circuitry is configured to map a logical register of a processor instruction to one or more of the physical processor registers.

Although the techniques are applicable to a single processor, in example embodiments two or more instances of execution circuitry such that the instruction issue circuitry is configured to issue a processor instruction for execution by any one of the instances of execution circuitry.

Another example embodiment provides data processing circuitry comprising:

instruction issue circuitry to issue processor instructions to instruction execution circuitry for execution, each processor instruction having one or more source and destination processor registers allocated for use in execution of that processor instruction, each said processor register having a respective register index;

the instruction issue circuitry being configured to detect whether a group of source processor registers allocated to a given processor instruction awaiting issue contain data available for use by the given processor instruction by comparing the register index of a given source processor register in the group with one or more register indices indicating the availability of data in respective processor registers, in which one or more register index bits indicated by identifying information associated with the given processing instruction are excluded from the comparison outcome.

Another example embodiment provides a data processing method comprising:

allocating one or more source and destination processor registers, of a set of processor registers each defined by a respective register index, to a processor instruction for use in execution of that processor instruction, the set of processor registers being a group of destination processor registers having a subset of their register indices in common; and associating, with the processor instruction, information to indicate the register index of one processor register of the group and identifying information to identify one or more bits of the register index which differ between the processor registers in the allocated group of processor registers.

Another example embodiment provides a data processing method comprising:

issuing processor instructions to instruction execution circuitry for execution, each processor instruction having one or more source and destination processor registers allocated for use in execution of that processor instruction, each said processor register having a respective register index; and detecting whether a group of source processor registers allocated to a given processor instruction awaiting issue contain data available for use by the given processor instruction by comparing the register index of a given source processor register in the group with one or more register indices indicating the availability of data in respective processor registers, in which one or more register index bits indicated by identifying information associated with the given processing instruction are excluded from the comparison outcome.

Figure 1:
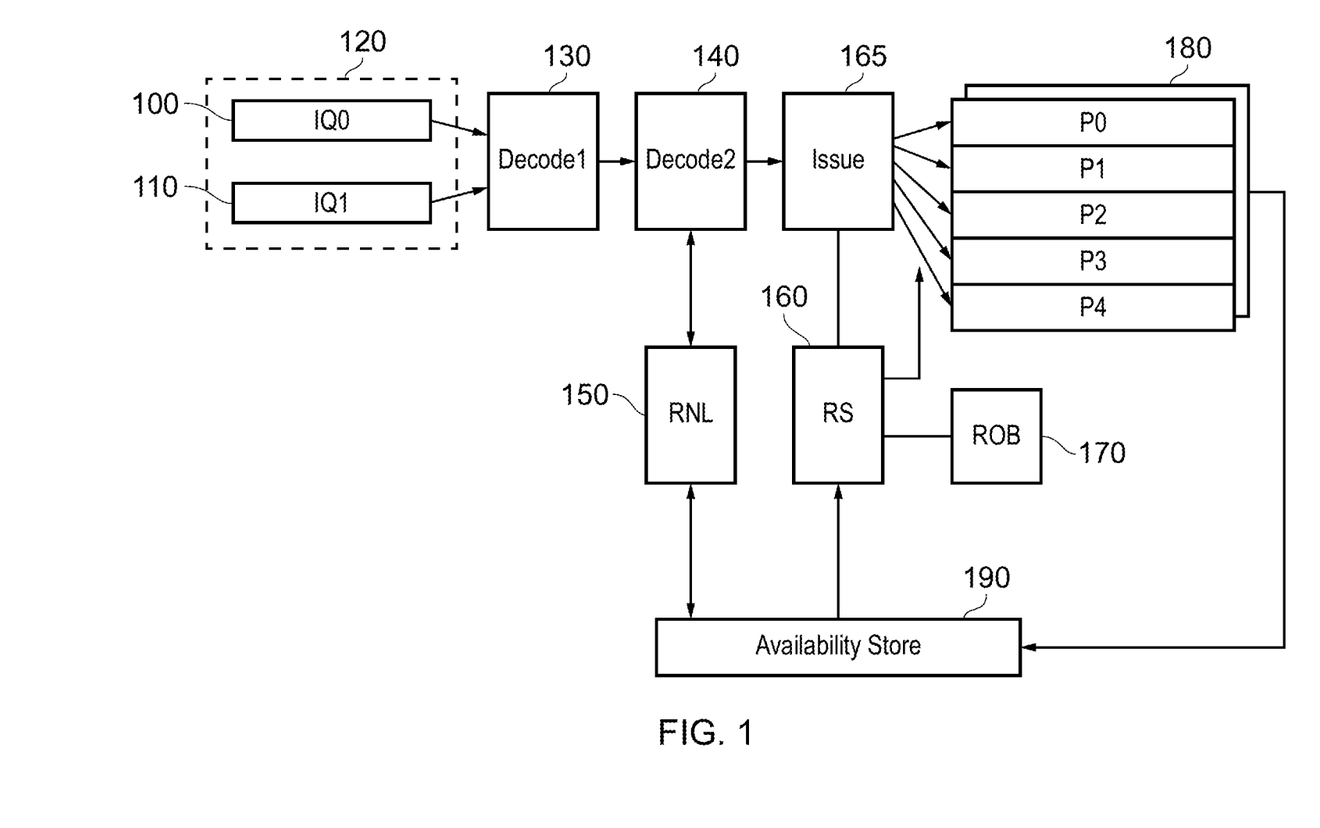
FIG. 1 schematically illustrates an instruction decoding pipeline as part of data processing circuitry.

Referring now to the drawings, FIG. 1 schematically illustrates an instruction decoding pipeline as part of a so-called out-of-order processor or data processing circuitry.

Out-of-order processing involves decoding and executing instructions according to the availability of the input data rather than necessarily the order in which they occurred in the program code for execution. This can provide a degree of performance improvement because each instruction has to wait primarily for its own input to be ready rather than for the preceding instruction in the program code order to be executed. Note that the term "out-of-order" does not require that instructions are executed in an order which is different to the program code order, but that the instructions can be executed in a different order of this nature.

In the example shown in FIG. 1, instruction queue circuitry 120 maintains one or more instruction queues to store fetched instructions. In the example shown, the instruction queue circuitry 120 maintains two instruction queues each corresponding to two processor threads each having a respective thread identifier (tid): an instruction queue 100 relating to tid0 and an instruction queue 110 relating to tid1. Instructions normally reside in an instruction queue until they can be dispatched for decoding and then execution.

Fetched instructions can be routed in one of two ways. If the queue (relating to the thread applicable to a fetched instruction) currently contains one or more instructions awaiting dispatch, then the fetched instruction is routed to the back (most-recently-added entry) of the relevant queue. If however the relevant queue is empty, then the instruction can be routed directly to a decoding stage, bypassing the queues. This bypass routing avoids the power consumption and time delay of adding an instruction to an empty queue, only for it to be immediately dispatched from that queue.

Instruction decode circuitry comprising (in the example shown) two decode stages 130, 140 is therefore arranged to receive fetched instructions either directly (under bypass routing), or from the instruction queue 100 for tid0, or from the instruction queue 110 for tid1.

The instruction decode circuitry comprises a first stage 130 including at least holding registers and a second stage 140 of decode logic. These arrangements form a decode path.

Instructions dispatched or routed for decoding are, if necessary, temporarily held by the holding register and decoded by the decode logic 140.

The decode logic 140 has access to a renaming list (RNL) 150 which maintains a list of the current or prevailing correspondence between so-called architectural registers and physical registers.

Architectural registers are those program registers specified by the instruction set architecture. Physical registers are those program registers provided by the physical execution hardware of the processor. In an out-of-order processor there may typically be a larger number of physical registers than the number of available architectural registers. When an instruction is decoded and prepared for execution, any architectural registers referenced by that instruction are mapped to available ones of the physical registers and the mapping, in terms of sets of so-called tag data, is maintained by the RNL 150. The RNL 150 can issue a stall indication in instances where the RNL has run out of available physical registers for a mapping (as required by the decoding of an instruction) to be implemented.

Decoded instructions are passed to a reservation station (RS) 160 associated with issue circuitry 165. The RS cooperates with a reorder buffer (ROB) 170 to provide a buffer for instructions for which the results of execution have not yet been "committed", or output into the program flow after execution. Instructions are dispatched and decoded in program flow order, but may be executed in another order, so the RS and ROB cooperate to allow coordination of this process and the cross-referencing of output operands (as mapped from architectural to physical registers) of instructions earlier in the program flow to input operands of instructions later in the program flow.

In the present example, execution is performed by one or more execution engines 180, each of which can comprise multiple pipeline stages (of which five are shown in a schematic example in FIG. 1, labelled (in pipeline order) as P0 ... P4). This is an example of execution circuitry having an execution pipeline of two or more pipeline stages. Two or more instances of execution circuitry can be provided such that the instruction issue circuitry is configured to issue a processor instruction for execution by any one of the instances of execution circuitry.

The instruction decode circuitry, in this example the decode logic 140, is therefore operable to allocate resources to an instruction being decoded. These resources can include physical registers and one or more entries in the RNL; space in the RS, space in the ROB and so on.

The issue circuitry 165 and the RS 160 cooperate with an availability store 190. The function and operation of the availability store 190 will be discussed further below. In general terms, an availability store 190 is provided to store information indicating whether each processor register is available for allocation as a destination processor register.

The allocation circuitry is configured to allocate processor registers which are indicated to be available for allocation and, in response to allocation of a processor register, to store information in the availability store indicating that the allocated processor register is not available for allocation; and the execution circuitry is configured, in response to completion of execution of a processor instruction, to store information in the availability store to indicate that a processor register which had been allocated to the completed processor instruction as a destination processor register is available for allocation.

The decode logic 140 and the renaming list 150 therefore provide an example of allocation circuitry to allocate one or more source and destination processor registers, of a set of processor registers each defined by a respective register index, to a processor instruction for use in execution of that processor instruction and to associate, with the processor instruction, information to indicate the register index of the allocated source and destination processor registers. As discussed below, the issue circuitry 165 and the reservation station 160 provide an example of instruction issue circuitry to issue processor instructions to instruction execution circuitry for execution, comprising detection circuitry to detect whether the one or more source processor registers allocated to a given processor instruction awaiting issue contain data available for use by that given processor instruction.

Figure 2:
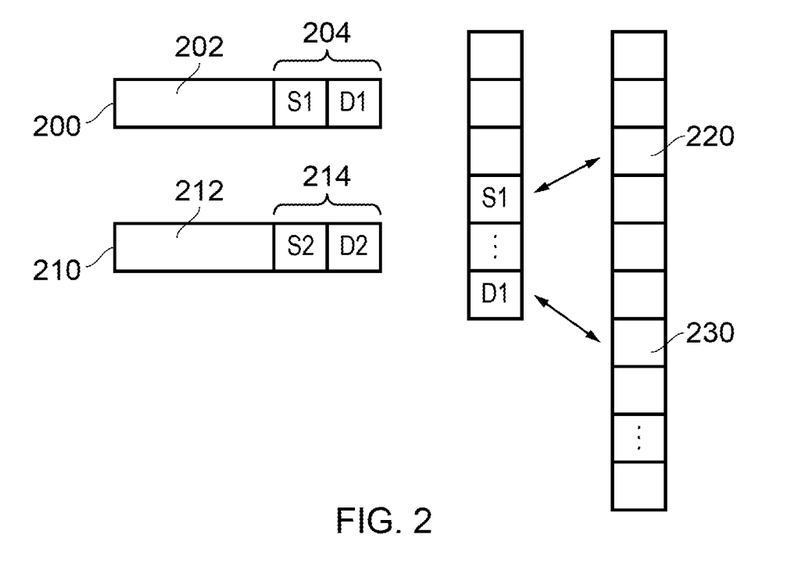
FIG. 2 schematically illustrates register mapping.

FIG. 2 schematically illustrates a register mapping process. This provides an example of an arrangement in which the processor registers are physical processor registers; the processor instructions define one or more logical registers; and the allocation circuitry is configured to map a logical register of a processor instruction to one or more of the physical processor registers.

In FIG. 2, two example data processing instructions 200, 210 are illustrated in schematic form. Each comprises an operation code (op-code) portion 202, 212 and an operand portion 204, 214.

The op-code portion defines a type of data processing operation to be carried out, such as an addition, a memory load or the like. The operand portion defines source (input) and destination (output) variables or registers so that the operation defined by the op-code is carried out on information defined by the source registers and the results are stored to the destination registers. Depending on the type of operation, zero or more source registers may be defined and zero or more destination registers may be defined. The example of FIG. 2 has one source register ("S") and one destination register ("D") for each of the two example operations.

As mentioned above, in an out-of-order processor, instructions can be executed in an order which is different to the program code order. Part of the techniques used to allow this to happen includes the mapping of architectural registers (those defined by the programming instruction set) and physical registers (those provided at a physical level by the processor). This mapping from a smaller number of architectural registers to a larger number of physical registers allows instructions which refer to the architectural registers to be decoded and issued for execution out of their programming code order. It is, however, then appropriate to keep track of any dependencies between the instructions so that an instruction which uses a particular architectural register as a source is not issued for execution until a preceding instruction (in the programming code order) which uses that architectural register as a destination has been executed. This dependency can be managed by the issue circuitry 165 in cooperation with the reservation station 160. The instruction issue circuitry is therefore configured to buffer a processor instruction for which the comparison by the instruction issue circuitry indicates that one or more source processor registers allocated to that processor instruction do not contain data which is available for use by that processor instruction.

The right hand side of FIG. 2 schematically illustrates a mapping between a source register S1 and a physical register 220 and a mapping between a destination register D1 and a physical register 230. The mappings are implemented by associating codes or "tags" with the decoded instructions, where the tags indicate physical registers in the set of available physical registers.

Figure 3:
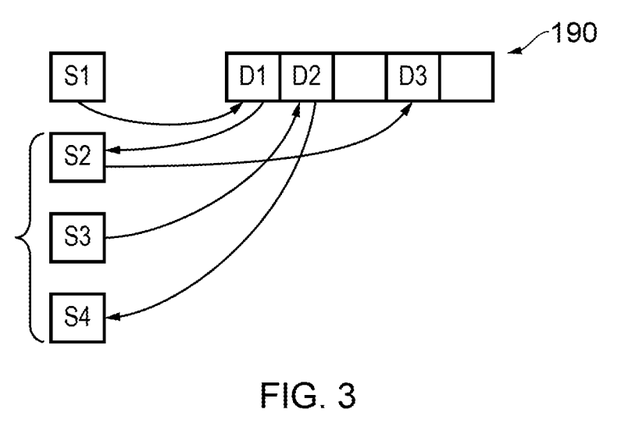
FIG. 3 schematically illustrates the operation of an availability store.

A set of dependencies is illustrated in FIG. 3, which also schematically illustrates the operation of the availability store 190. Here, the one or more register indices indicating processor registers available for use are configured to indicate that processor registers allocated as destination processor registers for any processor instructions which are currently being handled by the execution circuitry are unavailable The availability store provides information (such as a one-bit flag or indicator for each physical register) to indicate whether or not that physical register is currently mapped to a destination register of an instruction which has not been fully executed. For example, the flag may be set to a "1" to indicate that the corresponding physical register is currently in use, and to a "0" to indicate that the register is not in use. The flag is set in response to allocation (by the RNL) of a physical register to an architectural register, and is unset or released in response to that instruction completing execution.

In the example mappings shown in FIG. 3, a first instruction uses a source register S1 and outputs to a destination register D1. A second instruction in the program code order has a source register S2 which is the same as the destination register D1 of the previous instruction, and writes its output to a destination register D3. A third instruction has a source of S3 and writes to a designation D2, which is then used as the source S4 for a fourth instruction.

In this set of dependencies, the second instruction cannot execute until the first instruction (which writes its output value to the destination D1) has itself executed. Similarly, the fourth instruction which takes the content of D2 as its source data cannot itself execute until the preceding instruction which wrote to D2 has executed.

The issue circuitry 165, operating in cooperation with the reservation station 160, comprises "wake-up" logic or circuitry. This uses compare logic to detect whether the tag associated with a source operand matches the tag of a destination operand for which execution has completed, or in other words to detect whether the data required as the source of a particular instruction is ready for that instruction to be executed. The tag of such a destination operand provides an example of a register index indicating the availability of data in a respective processor register. It can, in some examples, be actively read by the issue circuitry but in other examples it can be provided by the reservation station to the issue circuitry (for example, in response to the processing reaching a particular stage) in a broadcast mode of operation. If the source data is ready, then (subject to other criteria such as execution pipeline availability) that instruction is issued for execution. If one or more source operands are not yet available, the instruction cannot be issued.

The wake-up logic uses multiple comparators, because each source of each entry in the reservation station has to be compared with each destination register. The comparison is on the basis of the tags allocated to the operands of the instructions.

In examples, therefore, the instruction issue circuitry is configured to perform a comparison in respect of one or more buffered instructions to detect whether a buffered instruction can be issued to the execution circuitry for execution.

The examples of FIG. 2 related to instructions each having one source operand and one destination operand. In some cases, however, a single instruction can have an operand defining more than one destination register. In some examples, two or more destination registers can be used to provide for storage of values larger than those which can be stored by a single register. In other examples, multiple different output values could be generated by a single instruction.

In previously proposed arrangements, the use of multiple destination registers in this way would require multiple instances of the compare logic as part of the wake-up functionality.

In examples of the present disclosure, one tag is allocated to a pair (or a group other than a pair) of registers allocated to a single instruction. The other register or registers (for a group of more than two registers) have tags which differ from that one tag by one or more bits. Mask information is provided so as to indicate which bit or bits differ between the pair or group of registers. This bit (or these bits) are then ignored or removed from the comparison by the compare logic.

Examples will be discussed below for the use of a pair of registers such that the respective tags differ by one bit. The mask provides an indication of which bit differs between the two tags. For example, in a four bit tag (used in FIGS. 6-8 as an example, for clarity of the diagrams) a mask value of (say) 0100 would indicate that the second most significant bit differs between the two tags (so that the two tags are x0yz and x1yz). The compare logic conducts a comparison (to detect whether a destination is available so that an instruction using that register as a source can be issued) but disregards the second most significant bit in the comparison.

In this way, despite there being two registers in use, only one comparison is required. This arrangement can save on circuitry and power consumption.

A similar arrangement can be used for groups of more than one register. In general, groups of $2^n$ registers (where n is an integer from 0 upwards) may be used. The mask contains n indications of bits to ignore.

If n=0 then the group is a group of just one register (a single register) and the mask indicates that no bits are disregarded in the comparison. In this example, when the allocation circuitry allocates one destination processor register to a processor instruction, the allocation circuitry is configured to associate, with the processor instruction, the identifying information to identify zero bits of the register index.

If n=1 then this is the example of a pair of registers discussed above. If n>1 then the example is of a group of more than two registers, with a corresponding number of bits indicated as bits to be ignored in the comparison. In these examples, the group of processor registers comprises $2^m$ processor registers having a subset of all but m bits of their register indices in common, where m is an integer equal to zero or more; and the identifying information identifies m bits of the register index which differ between the processor registers in the allocated group of processor registers.

Note that the bits indicated by the mask can be excluded from the comparison itself (not compared) or can take part in the comparison but then disregarded in the derivation of a conclusion or result from the comparison.

In selecting a pair (or larger group) of registers to allocate to a particular instruction, the renaming logic selects registers having tags which differ by only one bit (or by n bits in the case of a group of $2^n$ registers).

A process will now be described whereby the selection of any register allocation is carried out, taking into account the possible need to allocate such groups of tags. By preferentially allocating some registers the number of possible groups for later allocation can be maintained as a larger pool of possible groups.

These processes provide examples of the allocation circuitry being selectively operable to allocate, to a processor instruction, a group of destination processor registers having a subset of their register indices in common and to associate, with the processor instruction, information to indicate the register index of one processor register of the group and identifying information to identify one or more bits of the register index which differ between the processor registers in the allocated group of processor registers; and the instruction issue circuitry being configured to compare the register index associated with a source processor register allocated to the given processor instruction with one or more register indices indicating processor registers containing data available for use (or in other words, indicating the availability of data in respective processor registers), in which any register index bits indicated by identifying information associated with the given processor instruction are excluded from the comparison outcome.

The allocation of physical registers for mapping to architectural registers will now be discussed with reference to FIGS. 4-8.

Figure 4:
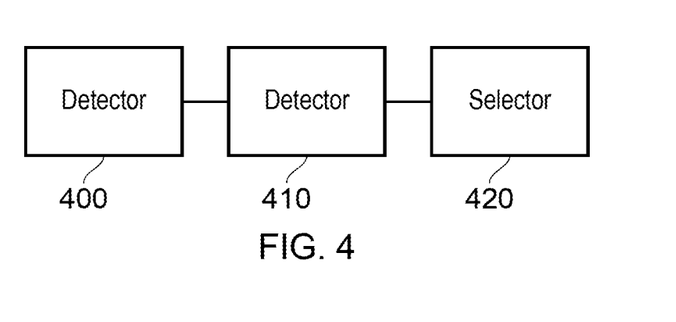
FIG. 4 schematically illustrates processing associated with a renaming list.

FIG. 4 schematically illustrates processing associated with a renaming list. An availability detector 400 provides data to a grouping detector 410 which in turn provides an input to a selector 420. The way in which these pieces of circuitry operate will be discussed with reference to a flow chart of FIG. 5 and schematic drawings of FIGS. 6-8.

Figure 5:
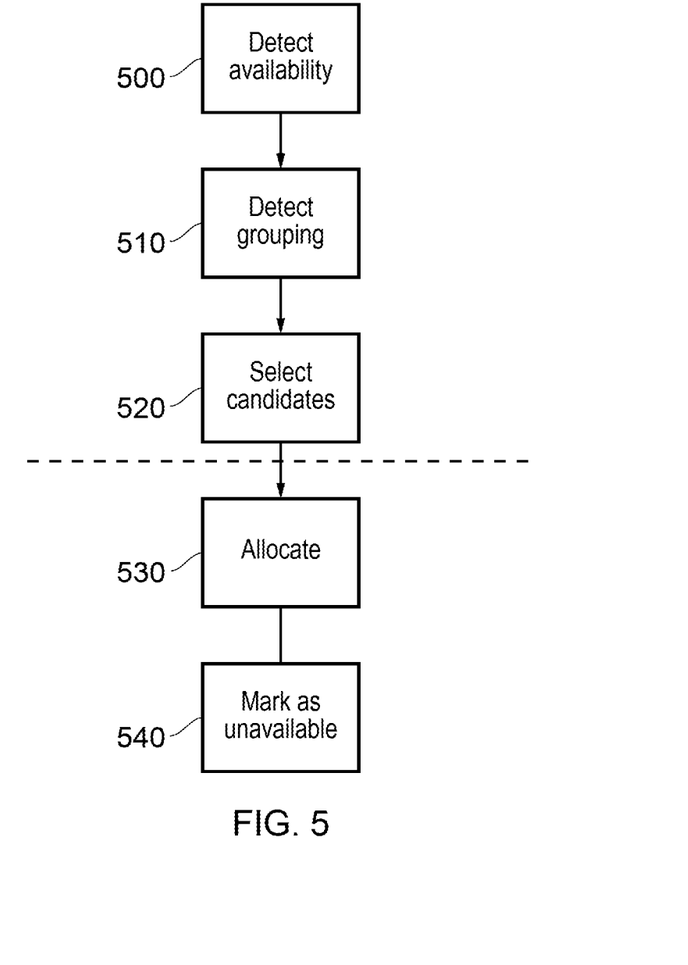
FIG. 5 is a schematic flowchart illustrating operations associated with a renaming list.

Referring to FIG. 5, at a step 500 the detector 400 detects the availability of physical registers which are currently not mapped to a register in use by an instruction being executed or which has been decoded for execution.

The availability is indicated by a flag in the availability store 190.

At a step 510, the detector 410 detects available groupings of the registers. Here, of the available registers, the step 510 involves detecting those which may be formed into groups of registers in which a tag value differs by one or more predetermined bits. This process will be discussed with reference to an example arrangement of FIGS. 6-8.

Figure 6:
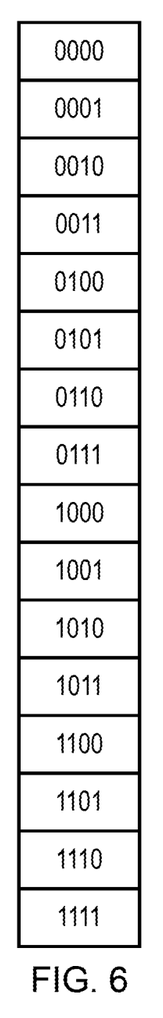
FIGS. 6 to 8 schematically illustrate register tags.
Figure 7:
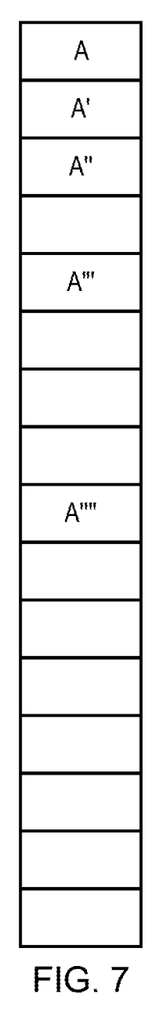

FIG. 6 schematically illustrates a set of 16 (four-bit) register tag values from 0000 up to 1111. FIG. 7 schematically illustrates a grouping such that the tag values indicated by the letters A', A", A''' and A'''' all differ from the tag value (0000) for the register A by just one bit. This means that any of them could form a pair of registers with the register 0000 (A) having three bits of their register tag value in common and just differing by the fourth bit. Similarly, in FIG. 8, starting from a register tag value (B) of 0011, the four other registers which differ by just one bit from that tag value are indicated as B' . . . B''''.

Figure 8:
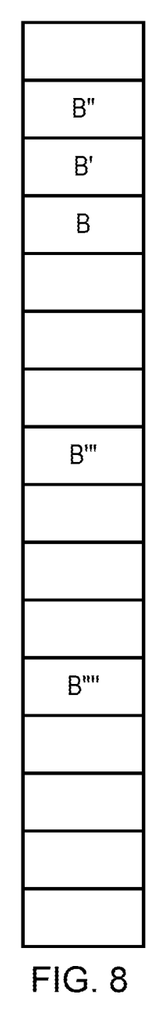

Because of a requirement to provide for instructions which have more than one source or destination register to be mapped, the step 510 detects permutations of available groupings amongst the remaining (currently unmapped) physical registers according to the principles set out with reference to FIGS. 6-8, and the step 520 selects one or more candidate registers for a current mapping operation.

In examples this selection is made so as to cause as little impact as possible to the availability of groups of two or more registers differing by one or more particular bits. For example, the number of possible two-register groups is detected for each remaining register tag, and that register tag (or tags) which forms part of the smallest number of possible two-register groups is selected for allocation.

At a step 530, the candidate(s) are allocated to a currently decoded instruction and the corresponding registers are marked in the availability store 190 as unavailable at a step 540.

The processing of FIGS. 4 and 5 therefore provides an example of the allocation circuitry being configured to select, from amongst the processor registers indicated by the availability store to be available for allocation, one or more candidate processor registers for allocation as destination processor registers at a next allocation operation. In examples, the candidate processor registers comprise: one or more candidate individual processor registers for allocation as individual processor registers; and one or more candidate groups of two or more processor registers, each group having a subset of their register indices in common. In examples, the allocation circuitry is configured to select candidate individual processor registers in dependence upon a detection, for a processor register indicated by the availability store to be available, of how many groups of available processor registers include that processor register. In example, the allocation circuitry is configured to preferentially select, as candidate individual processor registers, processor registers included in greater numbers of groups of available processor registers.

Figure 9:
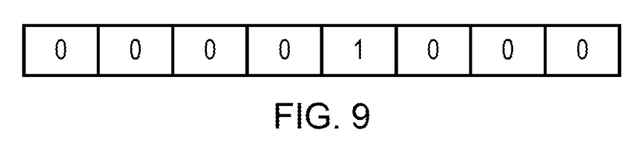
FIG. 9 schematically illustrates a tag mask.

FIG. 9 schematically illustrates a tag mask. In the example of FIG. 9, a bit value of "1" indicates a bit value which is common between two tags and so is to be ignored in a comparison of tags, whereas the "0" values represent bits to be included in a comparison. Of course, however, a different plurality could be used.

Figure 10:
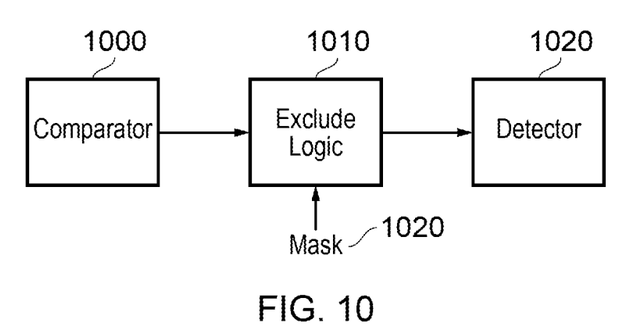
FIG. 10 schematically illustrates issue circuitry.

FIG. 10 schematically illustrates issue circuitry, such as a portion circuitry sometimes referred to as "wake-up logic", comprising a comparator 1000, exclude logic 1010 which is responsive to a mask 1020 of the type described with reference to FIG. 9, and a detector 1020.

In this example, the comparator 1000 compares all bits of the (single) tag value associated with the multiple-register operand with the tag value of a register which is now available after execution (as an example of a register index indicating the availability of data in a respective processor register). The comparator can be a multiple-bit exclusive OR (XOR) gate, one such gate for each bit position.

The results of the operation of the comparator 1000 are therefore a set of bit values which are 0 if the corresponding bits of the two tags being compared are the same, and 1 if they are different. These results are provided to the exclude logic which applies (for example) a multi-bit operation between the mask and the output of the comparator 1000 so as to set any bits flagged by the mask as "bit positions to be ignored" to 0. This is an example of excluding such bits from the comparison outcome. (In other examples, the comparisons relating to those flagged bits might not be carried out at all). The detector 1020 detects the presence of any 1s in the output of the exclude logic. If there are any 1s, then the comparison fails, which is to say that the registers are not detected to be the same.

The comparison can be performed in respect of instructions which have finished execution and/or in respect of instructions which have reached a stage in the processing pipeline which is such that the relevant register content has finalised.

Figure 11:
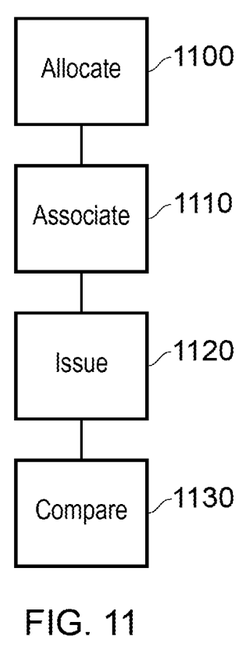
FIGS. 11 to 13 are schematic flowcharts illustrating respective methods.

FIG. 11 is a schematic flowchart illustrating a data processing method comprising:

allocating (at a step 1100) one or more source and destination processor registers, of a set of processor registers each defined by a respective register index, to a processor instruction for use in execution of that processor instruction, the set of processor registers being a group of destination processor registers having a subset of their register indices in common;

associating (at a step 1110), with the processor instruction, information to indicate the register index of one processor register of the group and identifying information to identify one or more bits of the register index which differ between the processor registers in the allocated group of processor registers;

issuing (at a step 1120) processor instructions to the instruction execution circuitry for execution, comprising detecting whether the one or more source processor registers allocated to a given processor instruction awaiting issue contain data available for use by that given processor instruction; and comparing (at a step 1130) the register index associated with a source processor register allocated to the given processor instruction with one or more register indices indicating the availability of data in respective processor registers, in which any register index bits indicated by identifying information associated with the given processor instruction are excluded from the comparison outcome.

Figure 12:
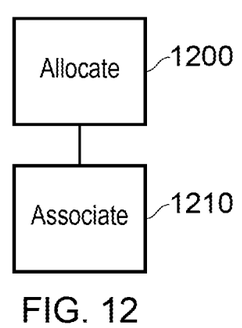

FIG. 12 is a schematic flowchart illustrating a data processing method comprising:

allocating (at a step 1200) one or more source and destination processor registers, of a set of processor registers each defined by a respective register index, to a processor instruction for use in execution of that processor instruction, the set of processor registers being a group of destination processor registers having a subset of their register indices in common; and associating (at a step 1210), with the processor instruction, information to indicate the register index of one processor register of the group and identifying information to identify one or more bits of the register index which differ between the processor registers in the allocated group of processor registers.

Figure 13:
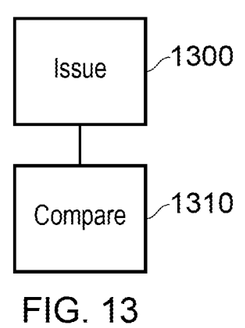

FIG. 13 is a schematic flowchart illustrating a data processing method comprising:

issuing (at a step 1300) processor instructions to instruction execution circuitry for execution, each processor instruction having one or more source and destination processor registers allocated for use in execution of that processor instruction, each said processor register having a respective register index; and detecting whether a group of source processor registers allocated to a given processor instruction awaiting issue contain data available for use by the given processor instruction by comparing (at a step 1310) the register index of a given source processor register in the group with one or more register indices indicating the availability of data in respective processor registers, in which one or more register index bits indicated by identifying information associated with the given processing instruction are excluded from the comparison outcome.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function, in which case software or program instructions by which the function is performed, and a providing medium such as a non-transitory machine-readable medium by which such software or program instructions are provided (for example, stored) are considered to represent embodiments of the disclosure. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Data processing circuitry comprising:
   allocation circuitry to allocate one or more source and destination processor registers, of a set of processor registers each defined by a respective register index, to a processor instruction for use in execution of that processor instruction and to associate, with the processor instruction, information to indicate the register index of the allocated source and destination processor registers;
   the allocation circuitry being selectively operable to allocate, to a processor instruction, a group of destination processor registers having a subset of their register indices in common and to associate, with the processor instruction, information to indicate the register index of one processor register of the group and identifying information to identify one or more bits of the register index which differ between the processor registers in the allocated group of processor registers.

2. Data processing circuitry according to claim 1, comprising:
   instruction issue circuitry to issue processor instructions to instruction execution circuitry for execution, comprising detection circuitry to detect whether the one or more source processor registers allocated to a given processor instruction awaiting issue contain data available for use by that given processor instruction;
   the instruction issue circuitry being configured to compare the register index associated with a source processor register allocated to the given processor instruction with one or more register indices indicating the availability of data in respective processor registers, in which any register index bits indicated by identifying information associated with the given processor instruction and identifying one or more bits of the register index which differ between the processor registers in an allocated group of processor registers are excluded from the comparison outcome.

3. Data processing circuitry according to claim 2, in which the one or more register indices indicating processor registers available for use are configured to indicate that processor registers allocated as destination processor registers for any processor instructions which are currently being handled by the execution circuitry are unavailable.

4. Data processing circuitry according to claim 3, comprising execution circuitry having an execution pipeline of two or more pipeline stages.

5. Data processing circuitry according to claim 2, in which the instruction issue circuitry is configured to buffer a processor instruction for which the comparison by the instruction issue circuitry indicates that one or more source processor registers allocated to that processor instruction do not contain data which is available for use by that processor instruction.

6. Data processing circuitry according to claim 5, in which the instruction issue circuitry is configured to perform a comparison in respect of one or more buffered instructions to detect whether a buffered instruction can be issued to the execution circuitry for execution.

7. Data processing circuitry according to claim 1, in which, when the allocation circuitry allocates one destination processor register to a processor instruction, the allocation circuitry is configured to associate, with the processor instruction, the identifying information to identify zero bits of the register index.

8. Data processing circuitry according to claim 1, in which:
   the group of processor registers comprises $2^m$ processor registers having a subset of all but m bits of their register indices in common, where m is an integer equal to zero or more; and
   the identifying information identifies m bits of the register index which differ between the processor registers in the allocated group of processor registers.

9. Data processing circuitry according to claim 2, comprising an availability store, to store information indicating whether each processor register is available for allocation as a destination processor register;
   in which the allocation circuitry is configured to allocate processor registers which are indicated to be available for allocation and, in response to allocation of a processor register, to store information in the availability store indicating that the allocated processor register is not available for allocation;
   and in which the execution circuitry is configured, in response to completion of execution of a processor instruction, to store information in the availability store to indicate that a processor register which had been allocated to the completed processor instruction as a destination processor register is available for allocation.

10. Data processing circuitry according to claim 9, in which the allocation circuitry is configured to select, from amongst the processor registers indicated by the availability store to be available for allocation, one or more candidate processor registers for allocation as destination processor registers at a next allocation operation.

11. Data processing circuitry according to claim 10, in which the candidate processor registers comprise:
   one or more candidate individual processor registers for allocation as individual processor registers; and
   one or more candidate groups of two or more processor registers, each group having a subset of their register indices in common.

12. Data processing circuitry according to claim 11, in which the allocation circuitry is configured to select candidate individual processor registers in dependence upon a detection, for a processor register indicated by the availability store to be available, of how many groups of available processor registers include that processor register.

13. Data processing circuitry according to claim 12, in which the allocation circuitry is configured to preferentially select, as candidate individual processor registers, processor registers included in greater numbers of groups of available processor registers.

14. Data processing circuitry according to claim 1, in which:
the processor registers are physical processor registers;
the processor instructions define one or more logical registers; and
the allocation circuitry is configured to map a logical register of a processor instruction to one or more of the physical processor registers.

15. Data processing circuitry according to claim 2, comprising two or more instances of execution circuitry such that the instruction issue circuitry is configured to issue a processor instruction for execution by any one of the instances of execution circuitry.

16. Data processing circuitry comprising:
instruction issue circuitry to issue processor instructions to instruction execution circuitry for execution, each processor instruction having one or more source and destination processor registers allocated for use in execution of that processor instruction, in which:
each said processor register has a respective register index;
where a group of processor registers allocated to a processor instruction have a subset of their register indices in common, that processor instruction is associated with identifying information to identify one or more bits of the register index which differ between the allocated group of processor registers; and
the instruction issue circuitry is configured to detect whether a group of source processor registers allocated to a given processor instruction awaiting issue contain data available for use by the given processor instruction by comparing the register index of a given source processor register in the group with one or more register indices indicating the availability of data in respective processor registers, in which one or more register index bits indicated by the identifying information associated with the given processing instruction are excluded from the comparison outcome.

17. A data processing method comprising:
allocating one or more source and destination processor registers, of a set of processor registers each defined by a respective register index, to a processor instruction for use in execution of that processor instruction, the set of processor registers being a group of destination processor registers having a subset of their register indices in common; and
associating, with the processor instruction, information to indicate the register index of one processor register of the group and identifying information to identify one or more bits of the register index which differ between the processor registers in the allocated group of processor registers.

18. A data processing method comprising:
issuing processor instructions to instruction execution circuitry for execution, each processor instruction having one or more source and destination processor registers allocated for use in execution of that processor instruction, each said processor register having a respective register index, in which where a group of processor registers allocated to a processor instruction have a subset of their register indices in common, that processor instruction is associated with identifying information to identify one or more bits of the register index which differ between the allocated group of processor registers; and
detecting whether a group of source processor registers allocated to a given processor instruction awaiting issue contain data available for use by the given processor instruction by comparing the register index of a given source processor register in the group with one or more register indices indicating the availability of data in respective processor registers, in which one or more register index bits indicated by the identifying information associated with the given processing instruction are excluded from the comparison outcome.

* * * * *